No. 761,084. PATENTED MAY 31, 1904.
A. A. LOWRY.
ROLLER BEARING.
APPLICATION FILED SEPT. 8, 1903.
NO MODEL. 2 SHEETS—SHEET 1.

Witnesses
Inventor
Andy A. Lowry
by Higdon, Longan & Hopkins Attys

No. 761,084. PATENTED MAY 31, 1904.
A. A. LOWRY.
ROLLER BEARING.
APPLICATION FILED SEPT. 8, 1903.
NO MODEL. 2 SHEETS—SHEET 2.
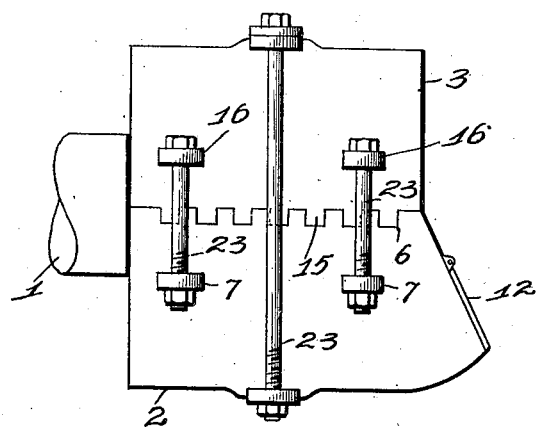
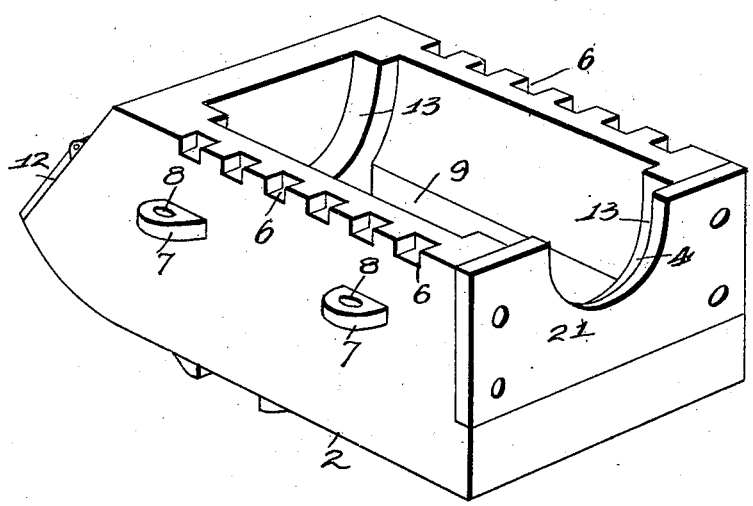

No. 761,084. Patented May 31, 1904.

UNITED STATES PATENT OFFICE.

AUDY A. LOWRY, OF ANNA, ILLINOIS.

ROLLER-BEARING.

SPECIFICATION forming part of Letters Patent No. 761,084, dated May 31, 1904.

Application filed September 8, 1903. Serial No. 172,206. (No model.)

*To all whom it may concern:*

Be it known that I, AUDY A. LOWRY, a citizen of the United States, residing at Anna, Union county, State of Illinois, have invented certain new and useful Improvements in Roller-Bearings, of which the following is a specification containing a full, clear, and exact description, reference being had to the accompanying drawings, forming a part hereof.

My invention relates to roller-bearings; and it consists of the novel features herein shown, described, and claimed.

My object is to construct a dust-proof roller-bearing primarily for railroad-cars, but which may be adapted to other uses; and, in terms, my invention comprises an upper section and a lower section having interlocking teeth and fastened together to form a dust-proof journal-box, said journal-box having a chamber to receive a circular series of straight cylindrical rollers having reduced ends, said lower section having a lubricating-chamber as long as the rollers and as wide as the circumference of the rollers below the roller-chamber and communicating therewith and extending upwardly and outwardly to the end of the section, a door closing said lubricating-chamber, lubricating material in said lubricating-chamber, and a circular series of long straight rollers in said roller-chamber in contact with the lubricating material, so that the enlarged portions of the rollers sustain the pressure of the journal-box upon the axle and so that the reduced portions of the rollers carry the rollers over the lubricating material, in combination with an axle having a groove to receive the enlarged portions of said rollers, and a dust-guard consisting of two pieces attached to the inner ends of the bearing-sections and forming a ring extending into a groove in said axle.

Figure 1:
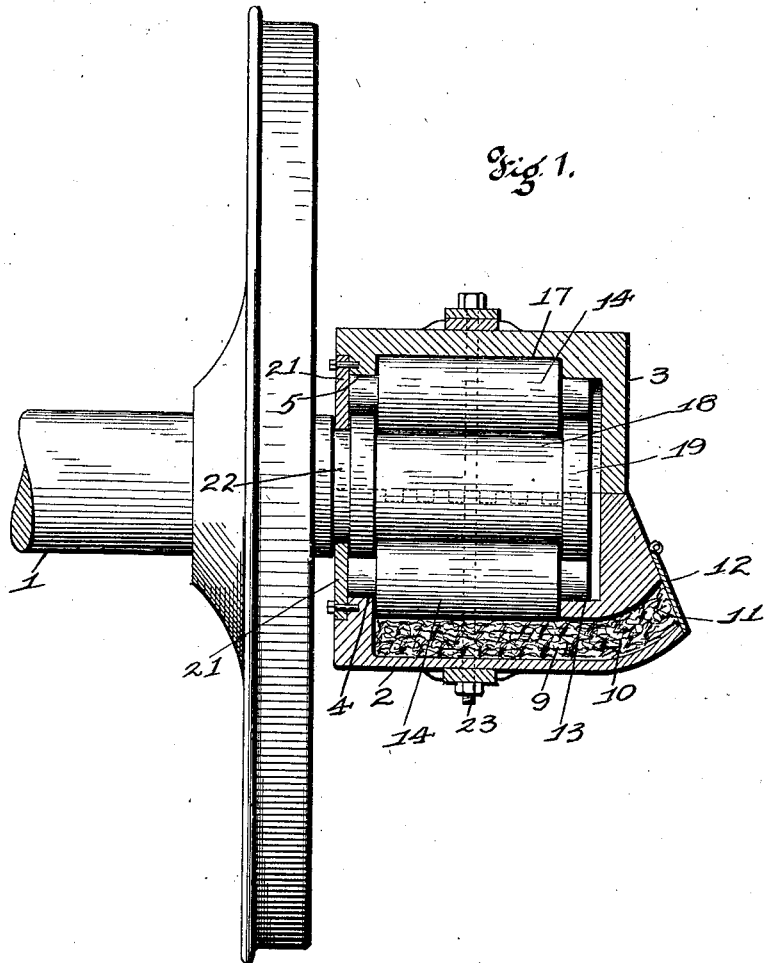
Figure 2:
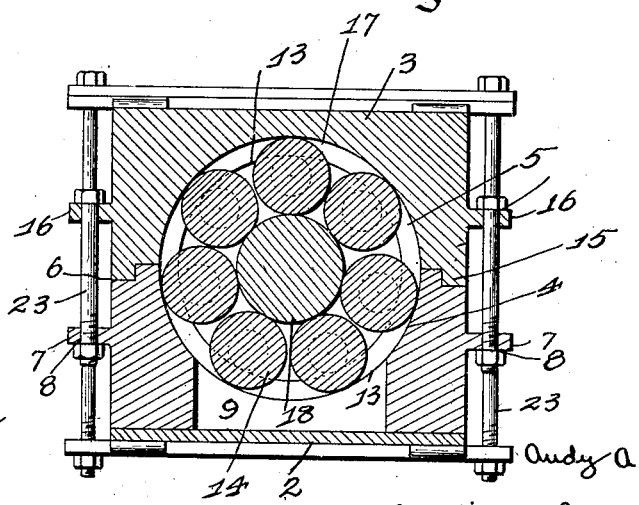

Figure 1 is a sectional detail of a roller-bearing constructed in accordance with the principles of my invention and applied to a car-wheel axle. Fig. 2 is a transverse section. Fig. 3 is a side elevation. Fig. 4 is a perspective of the lower bearing-section with the lower dust-guard section.

Referring to the drawings in detail, the improved roller-bearing is mounted upon the outer end of the car-axle 1 and comprises the lower section 2 and the upper section 3, having the interlocking teeth 15 extending from the upper section into the recesses 6 of the lower section, said sections being fastened together by the bolts 23, inserted through the openings 8 in the lugs 7, thus forming a dust-proof journal-box having a chamber the portion 17 of which receives the enlarged portions of the rollers 14 and the reduced portion 13 of which receives the reduced portions of the rollers, said lower section 2 having the lubricating-chamber 9 below the roller-chamber, the mouth 11 of said chamber extending outwardly and upwardly to the end of the section 2, said mouth being closed by the lid 12, the lubricating material 10, located in said lubricating-chamber, and said rollers 14 in said roller-chamber, in combination with the car-axle 1, having the groove 18 to receive the enlarged portions of the rollers 14, and the dust-guard 21, consisting of an upper section secured to the upper bearing-section and a lower section secured to the lower bearing-section and forming a ring around the axle and extending into the groove 22 in the axle, said dust-guard closing the opening formed by the recesses 4 and 5 in the bearing-sections.

The enlarged portions of the rollers 14 are long straight cylindrical bodies and support the pressure of the journal-box downwardly upon the axle, while the reduced portions of the rollers are short cylindrical bodies one of the chief functions of which is to support the rollers while they are passing over the lubricating-chamber, thus allowing the entire bearing-surfaces of the enlarged portions to contact with the lubricating material. The lubricating-chamber is wide enough so that the entire circumference of each roller is brought in contact with the lubricating material at each revolution of the roller around the axle, and this contact with the lubricating material is a rolling and not a sliding contact. The oil is carried by the rollers to every part of the bearing, and the surplus runs back to the lubricating-chamber.

When the sections 2 and 3 are securely bolted together, the axle cannot be removed, and there is no opening to admit dust to the bearing-surfaces.

I claim—

In a roller-bearing, a lower section 2; an upper section 3 engaging the lower section with interlocking teeth; said sections being bolted together to form a journal-box, said journal-box having a roller-chamber to receive a circular series of straight cylindrical rollers having reduced ends; a circular series of straight cylindrical rollers 14 having reduced ends fitting in said roller-chamber, so that the enlarged portions of the rollers sustain the pressure of the journal-box upon the axle, and so that the reduced ends sustain the rollers as they pass under the axle; and lubricating means.

In testimony whereof I have signed my name to this specification in presence of two subscribing witnesses.

AUDY A. LOWRY.

Witnesses:
    A. NEY SESSIONS,
    ALLEN HARGRAVE.